(No Model.)
J. C. KREMER.
FENCE.
No. 451,940. Patented May 12, 1891.
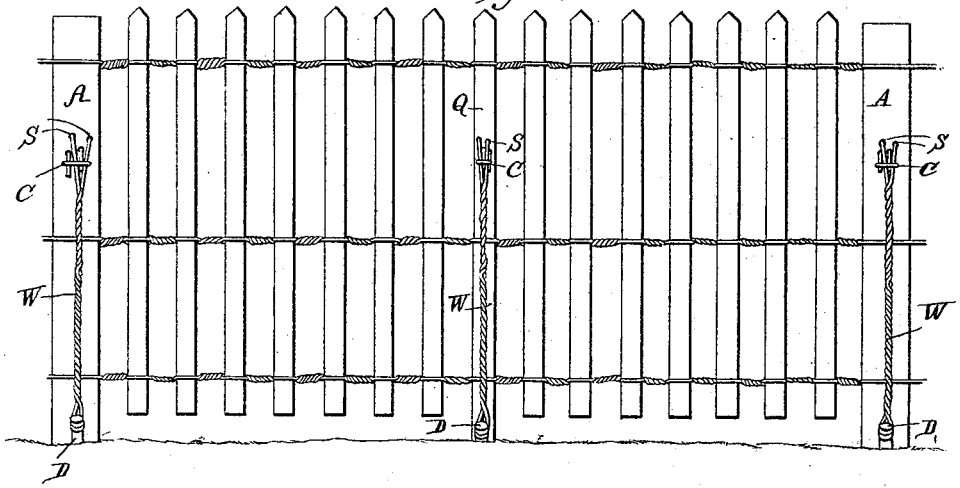
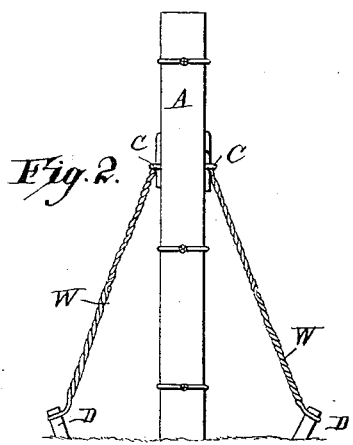
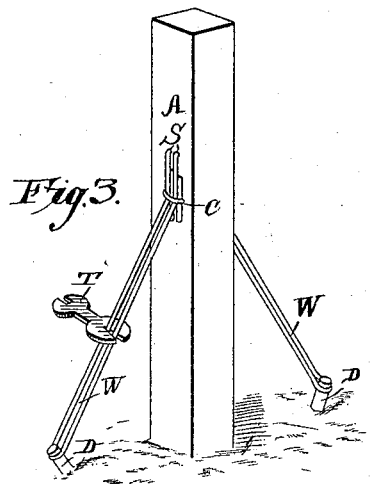
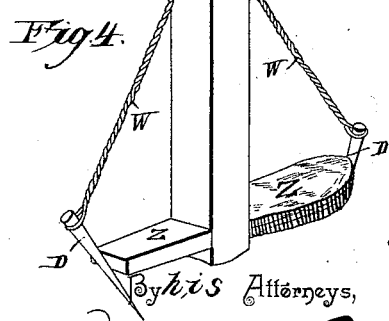
Witnesses
H. J. Duterich
N. L. Collamer
Inventor
John C. Kremer
By his Attorneys,
C. A. Snow & Co.

UNITED STATES PATENT OFFICE.

JOHN C. KREMER, OF WADSWORTH, OHIO.

FENCE.

SPECIFICATION forming part of Letters Patent No. 451,940, dated May 12, 1891.

Application filed September 30, 1890. Serial No. 366,687. (No model.)

*To all whom it may concern:*

Be it known that I, JOHN C. KREMER, a citizen of the United States, residing at Wadsworth, in the county of Medina and State of Ohio, have invented a new and useful Fence, of which the following is a specification.

This invention relates to fences; and the object thereof is to provide a fence which shall be very simple in construction, and which may be cheaply built, such fence having inclined braces from its posts or picket connected at their lower ends to stakes seated in the ground at each side of the fence post or picket, all as hereinafter more fully described and illustrated in the accompanying drawings, in which—

Figure 1 is a side elevation, and Fig. 2 an end elevation, of a section of my improved fence. Fig. 3 is a detail view showing the manner of tightening the brace-wires. Fig. 4 is a detail perspective view of the brace at the bottom of the posts.

Referring to the accompanying drawings, A A are the posts at each end of the fence.

Q is a long picket, usually one by four inches in size and about five feet in length, seated at its lower end in the ground and woven in at occasional points in the same way as any other picket.

D is a stake (usually two by two inches and two feet long) seated in the ground almost even with the surface, and Z is a block of stone, brick, or iron, usually eight inches long, placed a little under the surface of the ground between the stakes and post or picket, thus preventing the stake from being drawn toward picket or post in case of pressure being put against the fence. Leading upwardly from each stake are wires W, which are passed through a pair of holes S in the body of the post or picket, and led thence outwardly and connected to the upper end of the other stake D. Just below the holes S a staple C is inserted therein on either side, whereby the wires W are prevented from slipping through said holes. The wires may be engaged by a slot in one end of the tool T near their centers and twisted, in order to reduce the length between the stake D and the holes S on either side, and if it is desired at any time to loosen the tension on the stake the twist can of course be loosened again. However, under ordinary circumstances the stiffness of the wires will hold them twisted together. This twisting of the wires is especially advantageous where the blocks Z are independent members, because they are pieces of wood, metal, or stone which are of the sizes available, and therefore at different points will call for wires W of different lengths; but as such wires are all cut to the same length they would have to be taken up at the ends unless they are twisted, as above described.

The ends of the wires W, which extend through the posts A or long pickets Q, are bent either upwardly or downwardly, and the staples C on the opposite sides of such posts or long pickets are passed over these ends, whereby they are prevented from drawing through and becoming loose, thereby allowing the fence to fall to one side.

What I claim as new is—

1. In a fence, the combination, with the posts, the long pickets, and the fence-wires, of the stakes D at each side of said posts and pickets, and the independent blocks Z, removably seated in the ground between each stake and its post or picket, substantially as described.

2. In a fence, the combination, with the posts, the long pickets, and the fence-wires, of the stakes D at each side of said posts and pickets, the brace-wires W, leading from the stakes through holes in the posts and pickets and twisted within their length, and the staple C over the brace-wires near the holes in each post and picket, and the independent blocks Z, seated in the ground between each stake and its post, all substantially as described.

In testimony that I claim the foregoing as my own I have hereto affixed my signature in presence of two witnesses.

JOHN C. KREMER.

Witnesses:
JAMES D. PARDEE,
ALICE B. PARDEE.